United States Patent [19]

Junker

[11] Patent Number: 4,548,000

[45] Date of Patent: Oct. 22, 1985

[54] METHOD FOR PRODUCING THREADED SECTIONS OF THREADING TOOLS

[76] Inventor: Erwin Junker, Talstrasse 78, D 7611 Nordrach-Baden, Fed. Rep. of Germany

[21] Appl. No.: 564,079

[22] Filed: Dec. 20, 1983

[30] Foreign Application Priority Data

Feb. 14, 1983 [DE] Fed. Rep. of Germany ....... 3305034

[51] Int. Cl.$^4$ ............................ B24B 3/18; B24B 5/04
[52] U.S. Cl. .................... 51/288; 51/206 P; 51/95 TG
[58] Field of Search ............ 51/95 R, 95 LH, 95 TG, 51/206 R, 207, 288, 206 P; 409/66, 69, 73

[56] References Cited

U.S. PATENT DOCUMENTS

| | | | |
|---|---|---|---|
| 688,515 | 12/1901 | Hanson | 409/69 |
| 1,731,036 | 10/1929 | Arnold | 409/73 |
| 2,239,639 | 4/1941 | Amidon | 51/95 LH |
| 2,420,504 | 5/1947 | Stewart | 51/288 X |
| 2,787,868 | 4/1957 | Schifando | 51/288 X |
| 3,023,546 | 3/1962 | Beck | 51/288 X |
| 3,267,616 | 8/1966 | Stade et al. | 51/95 R |
| 4,289,110 | 9/1981 | Junker | 51/288 X |

FOREIGN PATENT DOCUMENTS 2147100 6/1972 Fed. Rep. of Germany ........ 51/288

Primary Examiner—Robert P. Olszewski
Attorney, Agent, or Firm—Wenderoth, Lind & Ponack

[57] ABSTRACT

The threaded portion of a tap drill is formed by mounting a tool blank for rotation about a longitudinal axis and mounting first and second grinding wheels integrally for rotation about a common second longitudinal axis parallel to the longitudinal axis of the tool blank. The tool blank and a first grinding wheel are rotated about the respective longitudinal axes thereof while moved longitudinally with respect thereto, thereby employing grinding ribs of the first grinding wheel to form threads in the blank. The second grinding wheel then is moved closer to the blank and a smooth peripheral surface of the second grinding wheel grinds away outer portions of the threads at an end portion of the tool blank, thus forming a tapered starting end of the tool.

3 Claims, 5 Drawing Figures

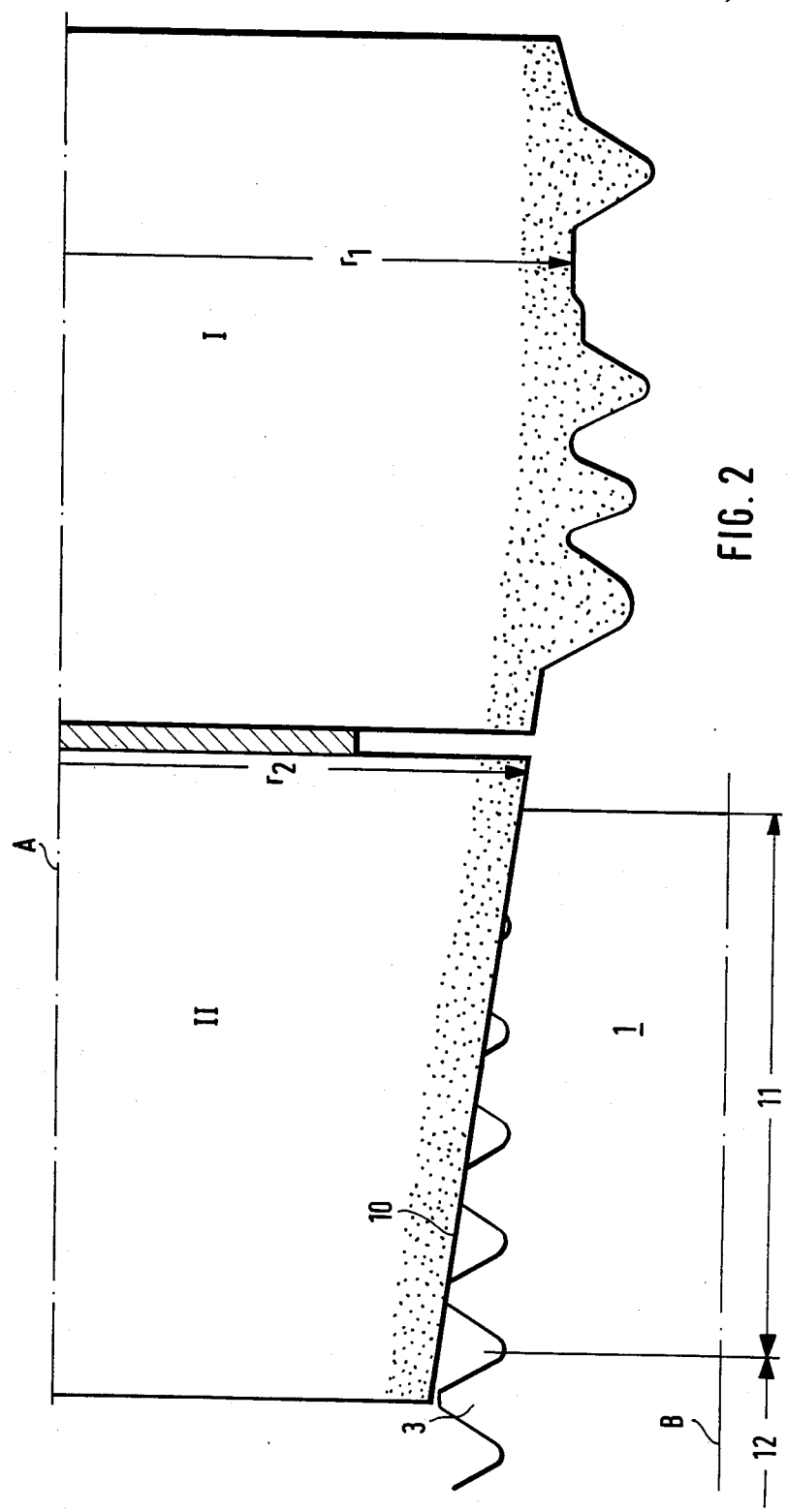

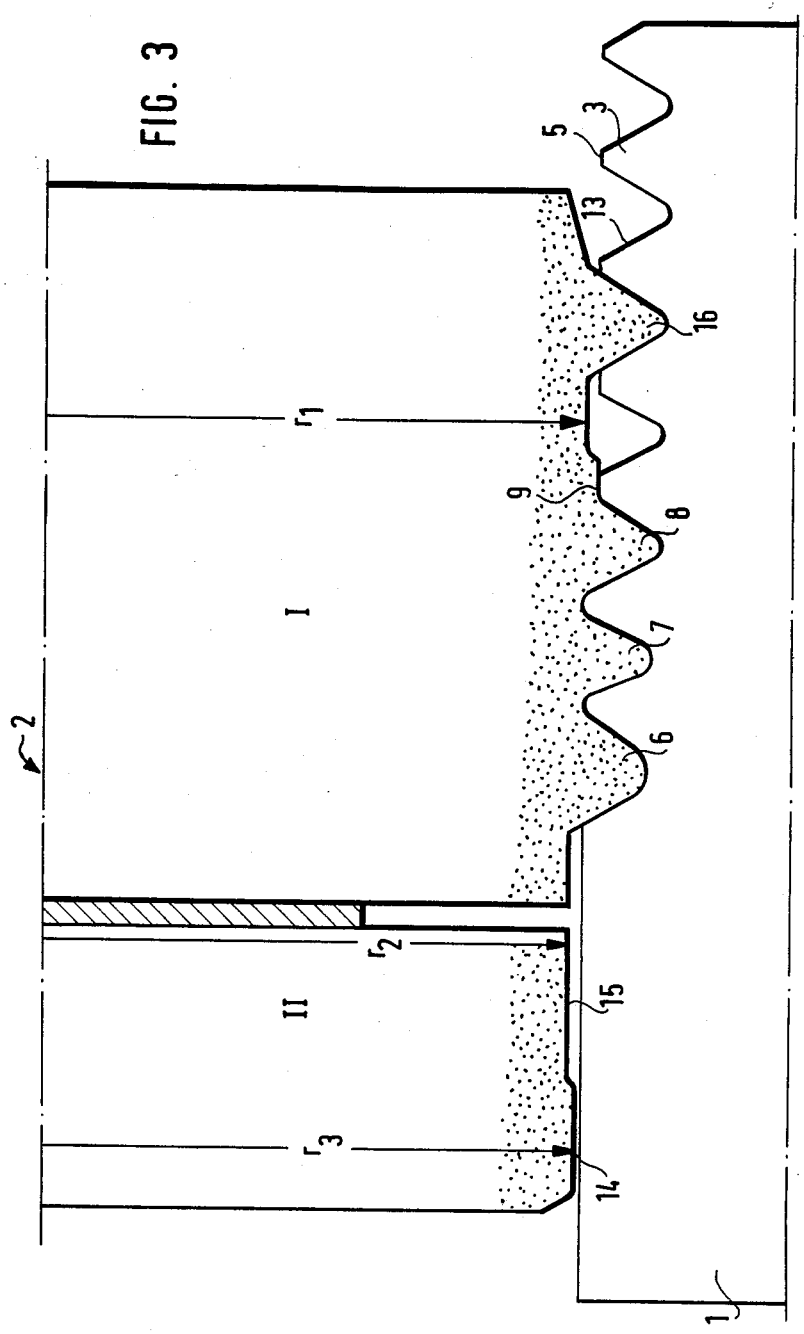

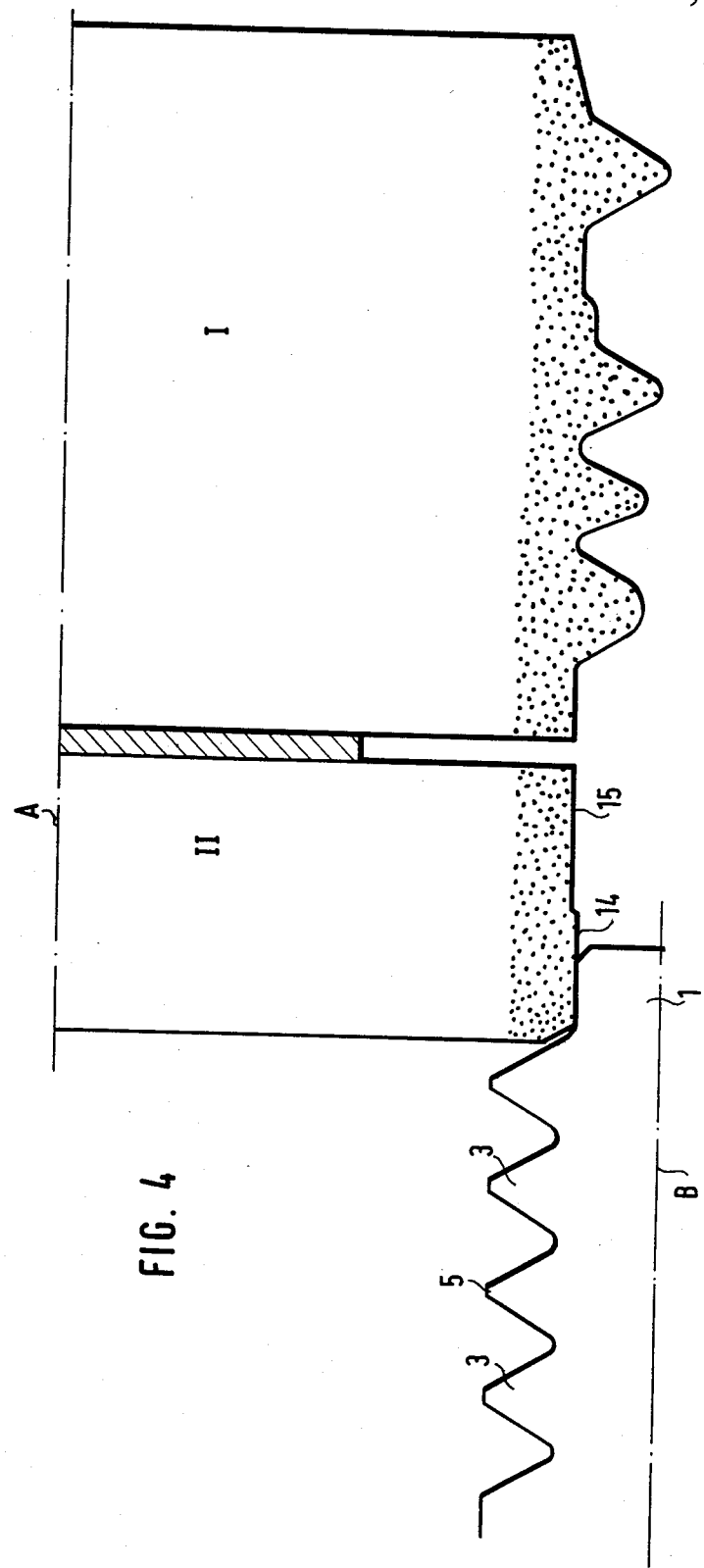

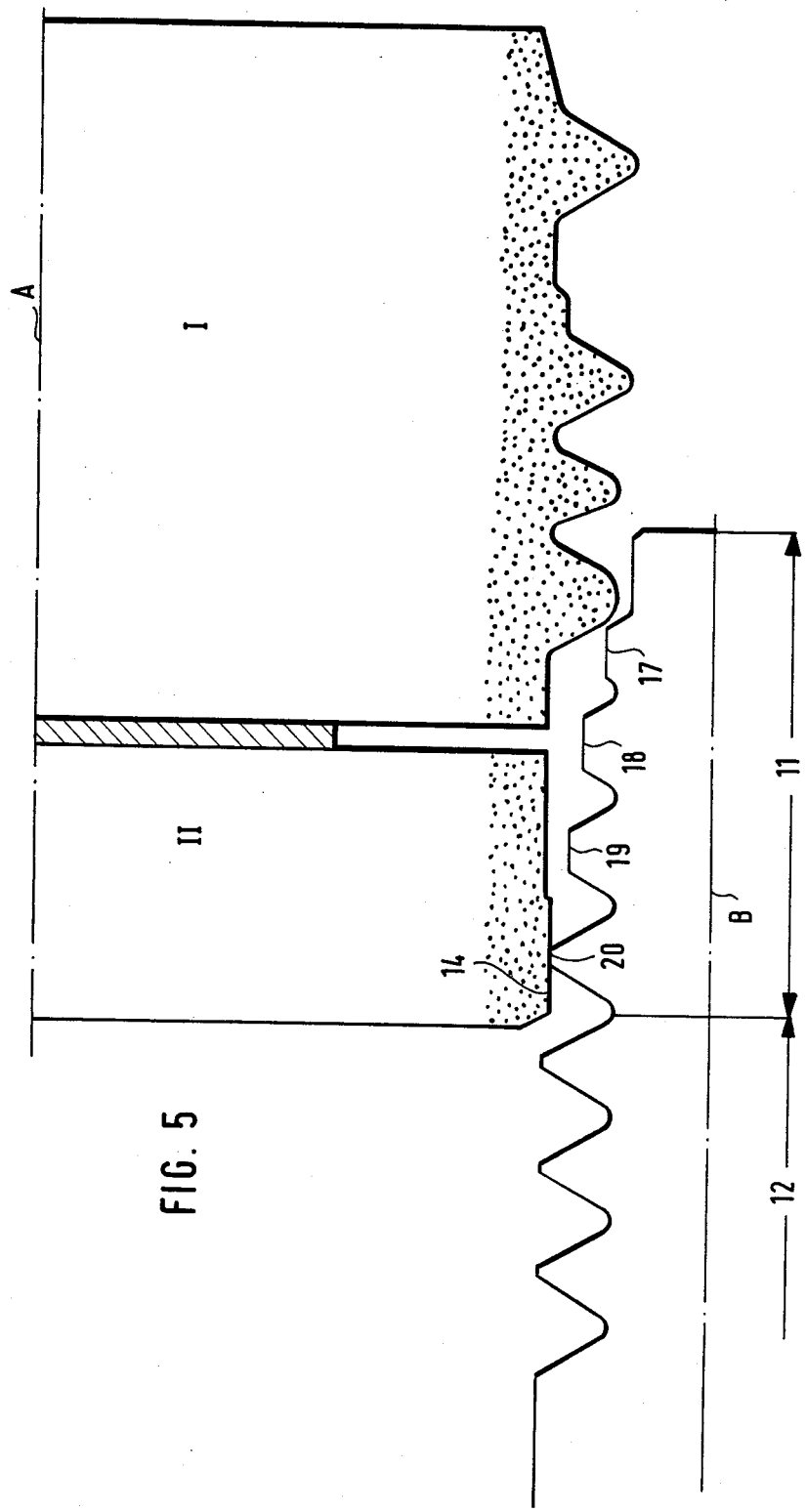

METHOD FOR PRODUCING THREADED SECTIONS OF THREADING TOOLS

BACKGROUND OF THE INVENTION

This invention relates to a method for forming the threaded section of a threading tool such as a tap drill of the type having longitudinal grooves for chip disposal.

In general, threading tools of this type are produced by machining a blank to form the threaded section, and this semi-finished product is then supplied to another machine at which other conventional operational processes are then carried out, for example, to bring the throat or starting portion of the threading tool into its final form. This method of production requires various machining devices and is, therefore, costly and time-consuming.

SUMMARY OF THE INVENTION

The object of the invention is to provide a method for the production of the threaded section of a threading tool, whereby costs and time may be saved.

According to this invention there is provided a method of producing the threaded section of a threading tool, in particular of a tap drill provided with longitudinal grooves for chip disposal, wherein the threads and a tapered throat are finished in a common operating process.

The throat may be suitably tapered towards its free end by means of the same tool with which the threads are machined to form thread bores.

In this respect the throat may be provided with cutting cogs shaped as cylindrical segments the diameters of which are stepped towards the tap drill tip in such a way that a stepped tapered throat is produced. The throat may also be tapered conically towards the tap drill tip.

The device for carrying out this method advantageously comprises, for the formation of the threaded section, a profiled body which may be rotated about an axis which is disposed parallel to and spaced from the workpiece axis and which may be moved towards the work-piece.

The profiled body suitably comprises two profiled grinding wheels which are matched with respect to the position of their active faces and disposed on a common shaft or axis, one grinding wheel having a peripheral profile required to grind the threads to form the thread bores, and the other grinding wheel having a smooth peripheral section for grinding the throat in a tapered or stepped fashion.

The other grinding wheel suitably has a cylindrical working face, although it may alternatively have a frustoconical working face.

The essential advantage of the invention is that it now is possible to finish the threading of a threading tool in one operating stage and in particular by using the same machine. In accordance with the preferred embodiment, two profiled grinding wheels are disposed adjacent to one another on a common axis, so that by using a design of this type the production costs of threading tools may be substantially reduced without the need to use any technically complex means. It is rather the case that the machining device itself is simplified and is also easy to maintain. The grinding wheels with the smooth machining surface may be exchanged in accordance with the particular manufacturing program as a function of the required profile of the throat. The profile of the grinding wheels may be provided with the correct shape, for example by means of trimming rolls. It has been shown in a surprising manner that as a result of the arrangement of the two grinding wheels on a common axis, it is possible to considerably reduce the costs of production of the threading tools and to cut threads with a greater accuracy of measurement with tools produced in this way.

BRIEF DESCRIPTION OF THE DRAWINGS

This invention will now be further described, by way of example only, with reference to the accompanying drawings, in which:

FIG. 2 is a view similar to FIG. 1 in which the throat of the tap drill has been ground;

FIG. 3 is a similar view showing a further embodiment of the invention during the machining of the thread into the thread bores;

FIG. 4 is a view similar to FIG. 3 during the initial grinding of the throat; and FIG. 5 is a partial view similar to FIGS. 3 and 4, in which there is a stepped tapered throat.

DETAILED DESCRIPTION OF THE INVENTION

Figure 1:
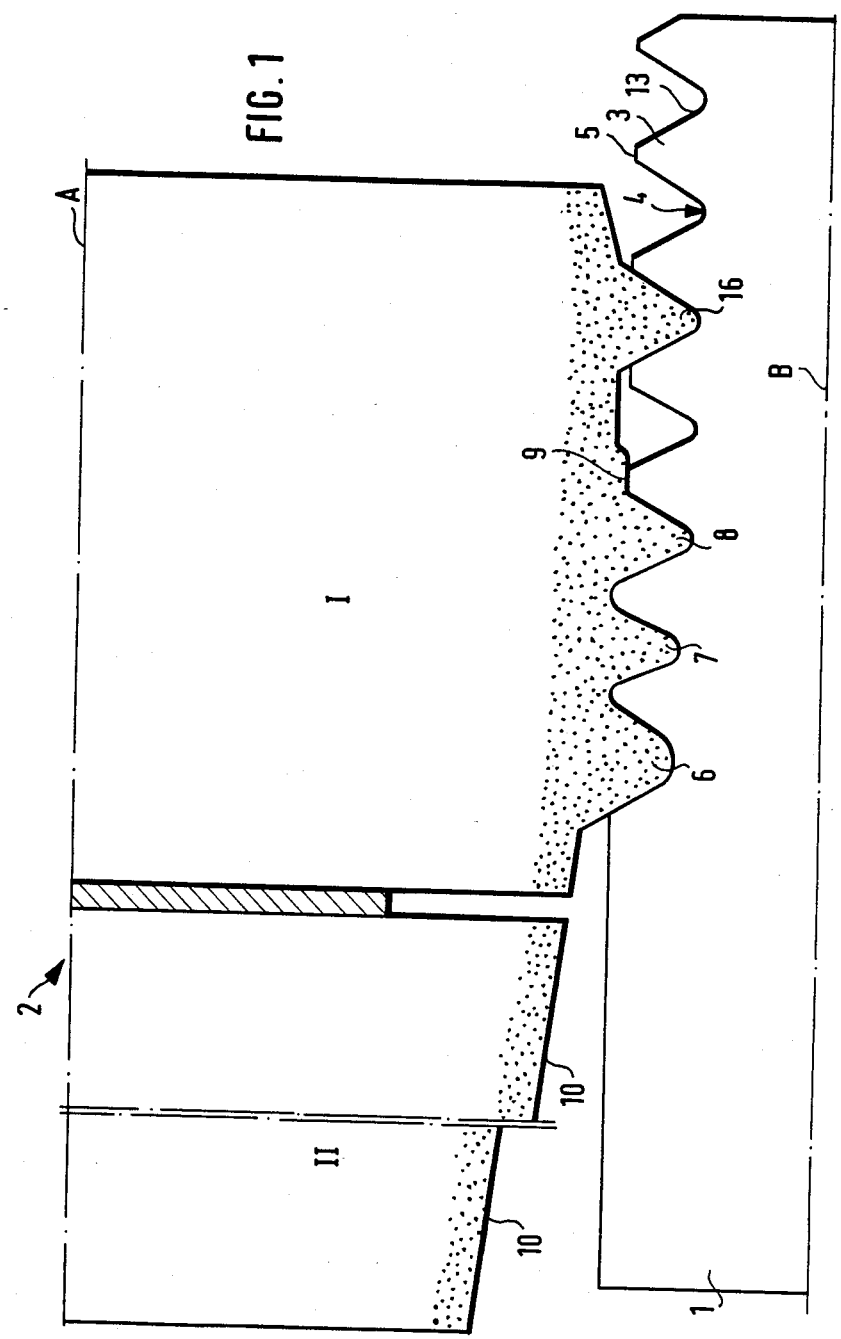
FIG. 1 is a partial section showing a tap drill being ground by associated grinding wheels.

Referring to FIG. 1, a tap drill 1 is shown being ground by a grinding wheel I. The tap drill 1 is a cutting tool which is known per se and which has longitudinal grooves or flutes spaced circumferentially between longitudinal areas or levels of tapping threads. The grooves are designed for chip disposal and provide cutting edges. In other words, a cutting tool of this type has cutting bores formed by threads ground into the body 1 in accordance with FIG. 1. The grinding tool of FIG. 1 comprises two grinding wheels I and II, the grinding wheel I comprising particularly profiled grinding ribs 6, 7, 8 and 16 for grinding of the required form of the tapping threads in a tap drill blank. A cylindrical grinding surface 9 for grinding the cutting cogs 5 is provided between the grinding ribs 8 and 16 which have a specific spacing from one another with respect to the thread pitch. The other grinding wheel II comprises a frustoconical peripheral profile 10. In FIG. 1 only the grinding wheel I, which grinds the individual threads into the thread bores, is operational.

In FIG. 2 the grinding wheel I is non-operational, while the grinding wheel II is shown grinding the starting portion or throat 11 of the tap drill. This grinding wheel II has a frustoconical peripheral surface 10 which grinds away the outer portions of the threads such that a conically tapered throat is produced. In a further area 12 of the remaining threaded section of the tap drill 1 the cutting edges are not ground, but remain in the shape formed by the grinding wheel I.

The position of an axis A common to the two grinding wheels I and II is modified in the operation of FIG. 2, with respect to the drill axis B, in comparison with the corresponding position of FIG. 1. Thus during the grinding of the threads in the operation of FIG. 1, the spacing of the axes A and B from one another remain constant, while such spacing is modified in the operation of FIG. 2 to the extent that the conical grinding section 10 of the wheel II is made operational. So that the two grinding wheels cannot interfere with each other's operation, the greatest radius $r_2$ of the grinding wheel II is less than the smallest radius of the grinding wheel I, which is at maximum $r_1$ (see FIG. 2).

FIGS. 3, 4 and 5 show a further embodiment of the grinding body arrangement of the invention. While the working profile of the grinding wheel I corresponds to that of the grinding wheel I of FIGS. 1 and 2, the grinding wheel II has cylindrical surfaces 14, 15, the cylindrical surface 14 having a greater radius $r_3$ than the cylindrical surface 15 ($r_2$). The tap drill 1 is first ground by the grinding wheel I which grinds the individual threads to form thread bores. In this respect the operation is identical to the first step of the arrangement shown in connection with FIGS. 1 and 2. After grinding of the threads, the grinding wheel II becomes operational, and grinds with its cylindrical peripheral profile 14 the individual cutting cogs such that stepped cuttings cogs 17, 18, 19, 20 are produced (FIG. 5). The starting portion or throat 11 thereby has a configuration which is tapered in steps towards the drill tip by grinding with the operational grinding surface 14 of the grinding wheel II. The remaining threaded section 12 does not need to be further machined by the grinding wheel II, but retains the profile ground into it by the grinding wheel I.

During grinding of the threads form the thread bores in accordance with FIG. 3, the axis A, of the two grinding wheels I and II retains a constant spacing with respect to the drill axis B. However, the spacing of the two axes A and B is modified during grinding of the throat 11, since the grinding wheel must be moved towards the tool, or vice versa.

Suitable modifications to the arrangements described may be made without departing from the scope of the invention. It is possible therefore to produce, in addition to threading tools such as tap drills, for example self-tapping screws and the like.

I claim:

1. A method for forming the threaded portion of a threading tool such as a tap drill, said method comprising:

providing a tool blank having a first longitudinal axis and longitudinal grooves spaced circumferentially between longitudinal areas to be threaded mounting said tool blank for rotation about said longitudinal axis thereof;

providing a grinding tool including a first grinding wheel having extending from the periphery thereof a plurality of integral grinding ribs and a second grinding wheel having a smooth peripheral surface;

mounting said first and second grinding wheels integrally for rotation about a common second longitudinal axis parallel to said first longitudinal axis;

at a first spacing between said first and second longitudinal axes, rotating said tool blank and said grinding tool about respective said longitudinal axes, while imparting relative axial movement between said tool blank and said grinding tool, and thereby grinding into said longitudinal areas of said tool blank and forming threads therein by said ribs of said first grinding wheel, while maintaining said peripheral surface of said second grinding wheel out of contact with said tool blank; and moving said first and second longitudinal axes closer to each other than said first spacing while bringing said peripheral surface of said second grinding wheel into contact with said threads at an end portion of said tool blank, and thereby grinding away outer portions of said threads at said end portion to form a tapered end of said tool.

2. A method as claimed in claim 1, comprising providing said second grinding wheel with a frustoconical said smooth peripheral surface, and therewith forming a conically tapered said end portion of said tool.

3. A method as claimed in claim 1, comprising providing said second grinding wheel with a cylindrical said smooth peripheral surface, and therewith grinding away said outer portions of said threads at said end portion in a sequentially radially inwardly stepped manner.

* * * * *